(No Model.)

H. C. BABCOCK.
MACHINERY BELT.

No. 338,016.  Patented Mar. 16, 1886.

WITNESSES:

INVENTOR:
H. C. Babcock
BY Munn & Co.
ATTORNEYS.

UNITED STATES PATENT OFFICE.

HOLLAND C. BABCOCK, OF NEW YORK, N. Y.

MACHINERY-BELT.

SPECIFICATION forming part of Letters Patent No. 338,016, dated March 16, 1886.

Application filed December 9, 1885. Serial No. 185,133. (No model.)

*To all whom it may concern:*

Be it known that I, HOLLAND C. BABCOCK, of the city, county, and State of New York, have invented a new and Improved Machinery-Belt, of which the following is a full, clear, and exact description.

My invention relates to certain improvements in leather-link belts, and has for its principal object to increase the strength and durability of the belt without diminishing its area of contact or frictional surface with the pulleys.

Another object is to practically combine metal washers with the leather links upon the transverse rods of the belt.

Reference is to be had to the accompanying drawings, forming part of this specification, in which similar letters of reference indicate corresponding parts in all the figures.

Figure 1:
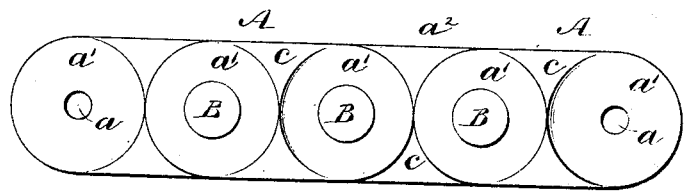
Figure 2:
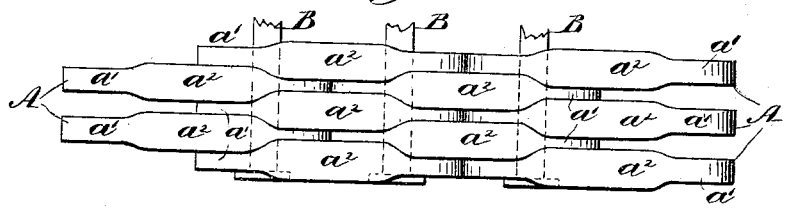
Figure 3:
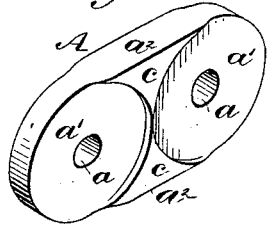
Figure 4:
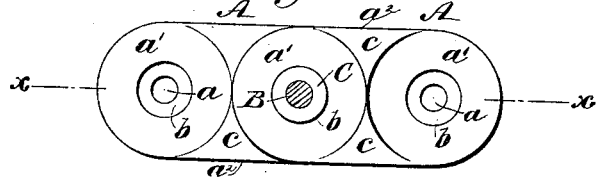
Figure 5:
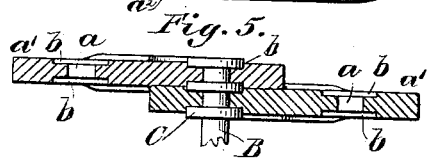

Figure 1 is an edge view of a part of a link-belt made in accordance with my invention. Fig. 2 is a plan view of the same showing the edges of the links. Fig. 3 is a perspective view of one of the leather links with its ends compressed. Fig. 4 shows the leather links compressed at the ends and countersunk about the orifices through which the transverse rods pass, and Fig. 5 is a sectional view taken on the line $x\ x$ of Fig. 4.

A represents the leather links; B, the transverse metal rods on which the links are placed; and C represents metal washers placed upon the rods B between the links A. These washers may be used or not, as desired. The links A are of the usual elliptical form, and have the orifices $a\ a$ formed in them for the rods B, and the links are solidified at their ends by compression, which reduces the thickness of the links, as indicated at $a'\ a'$. The side edges, $a^2\ a^2$, at the center of the links are left the full thickness of the leather, so the surface of the links that comes in contact with the pulleys when the belt is used will be as great as possible, thus tending to prevent all danger of the belt slipping on the pulleys. In some cases in compressing the ends of the links I shall at the same time form countersinks $b$ on one or both sides of the links about the orifices $a$, to receive the metal washers C, placed upon the rods B between the links, as shown in Fig. 5. Triangular portions $c\ c$ are left uncompressed at the transverse center of the links, so that the broad surfaces $a^2$ will not crush down, and so, owing to the loose texture of the leather in an unsolidified state, the links will have a slight central edgewise elasticity which relieves the belt of rigidity and the individual links from strain at the ends in passing around the pulleys. The belt will be built up by placing the links A upon the rods B, as shown in Fig. 2, the rods being headed at both ends at the edges of the belt to retain the links in close contact with each other on the rods. By compressing the ends of the links a greater number of links can be placed upon the same length of rods than in case the leather were used in its natural state, thus forming a more compact belt, with increased surface of contact with the pulleys, and the compressing and solidifying of the links increase their firmness, strength, and durability.

Having thus described my invention, what I claim as new, and desire to secure by Letters Patent, is—

1. As an improved article of manufacture, a leather link, substantially as described, for machinery-belts, having its ends solidified by compression and reduced in thickness, substantially as described.

2. The link A, of leather, and formed with the parallel openings $a$, and made of greater thickness in the center than at its ends, substantially as and for the purposes set forth.

3. The leather link A, compressed at $a'$ at its ends, and countersunk at $b$ about the orifices $a$, substantially as described.

HOLLAND C. BABCOCK.

Witnesses:
H. A. WEST,
C. SEDGWICK.